United States Patent
Ariyoshi et al.

[15] 3,678,026
[45] July 18, 1972

[54] METHOD OF PURIFYING LOWER ALKYL ESTERS OF α-L-ASPARTYL-L-PHENYLALANINE

[72] Inventors: Yasuo Ariyoshi; Tetsuo Yamatani; Noboru Uchiyama, all of Kanagawa-ken; Sato Naotake, Tokyo, all of Japan

[73] Assignee: Ajinomoto Co., Inc., Tokyo, Japan

[22] Filed: Dec. 28, 1970

[21] Appl. No.: 102,184

[30] Foreign Application Priority Data

Dec. 30, 1969 Japan..................................44/1753

[52] U.S. Cl..............................................260/112.5, 99/141
[51] Int. Cl..................................C07c 103/52, C07g 7/100

[58] Field of Search..............................................260/112.5

[56] References Cited

UNITED STATES PATENTS 3,475,403  10/1969  Mazur et al..........................260/112.5
3,492,131  1/1970   Sclatter et al.......................260/112.5

*Primary Examiner*—Elbert L. Roberts
*Attorney*—Kelman and Berman

[57] ABSTRACT

The lower alkyl esters of α-L-aspartyl-L-phenylalanine, known artificial sweeteners, are separated from the bitter tasting β-isomers and other impurities by the low solubility of their adducts with certain aromatic carboxylic acids and phenols in water.

3 Claims, No Drawings

METHOD OF PURIFYING LOWER ALKYL ESTERS OF α-L-ASPARTYL-L-PHENYLALANINE

This invention relates to the purification of lower alkyl esters of α-L-aspartyl-L-phenylalanine.

The esters are known artificial sweeteners having a taste closely similar to that of cane sugar (Belgian Pat. No. 717,373). They are readily prepared from the corresponding esters of phenylalanine by reaction with aspartic anhydride, but the reaction product contains enough of the somewhat bitter tasting β-isomers to require purification.

α-L-Aspartyl-L-phenylalanine esters sufficiently free from the β-isomer to avoid the bitter taste of the latter have been prepared from the crude synthetic product by repeated recrystallization from water. However, the solubilities of the compounds are not sufficiently different to make the method practical unless the amount of β-isomer initially present is small. Moreover, the α-isomers, as α-bonded dipeptide esters generally, tend to be converted to the corresponding diketopiperazines during repeated recrystallization, and the yield of the desired product is reduced. No organic solvent is known to be more useful for recrystallization than water.

Other impurities, including unreacted starting materials and by-products are associated with the lower alkyl esters of α-L-aspartyl-L-phenylalanine when the latter is prepared by other methods, and the recovery of an adequately pure α-isomer from such other reaction products has not been possible prior to this invention.

It has now been found that the lower aklyl esters of α-L-aspartyl-L-phenylalanine form adducts, insoluble or only sparingly soluble in water at pH 2 to 7, with certain aromatic compounds which do not form similar adducts with the corresponding β-isomers nor with other impurities associated with the desired sweetener material when prepared by any method known at this time. The aromatic compounds suitable for the purification method of this invention are either carboxylic acids or phenols, more specifically, they are β-phenylpropionic acid, cinnamic acid, o-fluorobenzoic acid, p-hydroxybenzoic acid, gentisic acid, β-resorcylic acid, 5-chlorosalicylic acid, 3,5-dinitrobenzoic acid, 2,4-dichlorophenoxyacetic acid, 2-naphthoic acid, β-naphthoxyacetic acid, 2,4-dichlorophenol, 2,5-dichlorophenol, and 2,6-dichloro-4-nitrophenol.

The compounds which do not form water-insoluble adducts with the fourteen acids and phenols listed above include, in addition to the esters of β-L-aspartyl-L-phenylalnine, such impurities frequently accompanying the desired α-isomers as aspartic acid, aspartylaspartic acid, the lower alkyl esters of phenylalanine, inorganic salts, and organic coloring matter of uncertain composition and are left behind in an aqueous solution from which the α-isomer is precipitated as an adduct with the afore-mentioned acids or phenols.

The precipitation of the adducts is not affected by the presence of water soluble or water miscible inert solvents such as methanol, ethanol, propanol, ethyleneglycol, isobutyleneglycol, acetone, methylethylketone, diethyl ketone, tetrahydrofuran, dioxane, acetonitrile, dimethylformamide, dimethylsulfoxide, or α-butyrolactone. The α-aspartyl phenylalanine esters are precipitated as their adducts from the aqueous system at any pH between 2 and 7, but they are least soluble at pH 3 TO 5,5, and this PH range is preferred for highest yields. The soluble salts of the precipitants, such as their sodium and potassium salts, are as effective as the free acids or phenols. The amount of precipitant is not critical, but at least one mole per mole of the α-derivative is needed for a good yield, and only slight improvement is possible by raising the mole ration of 3:1. No beneficial effects have been observed from more than 3 moles precipitant per mole of α-aspartyl phenylalanine ester.

The solubility of the adducts in aqueous media increases gradually with temperature. While adducts are formed and may be precipitated at elevated temperatures lower than 100° C., the yield increases with lower temperatures, and it is preferred to precipitate the adducts from the aqueous system at the lowest temperature that can be reached conveniently. In an aqueous medium free from amounts of organic solvents which depress the freezing point, best results are obtained therefore by carrying out the precipitation at a temperature above 0° C., but not substantially higher than 5° C., and it is usually more economical to operate at temperatures of 10° C. or less than to save the expense of refrigeration. Full precipitation of the adduct may take several hours to two days at the preferred low precipitation temperatures.

The adducts are separated from the aqueous medium by filtering, decanting, or centrifuging, and are readily decomposed for recovery of the purified α-isomers by means of aqueous solutions of hydrochloric, sulfuric, benzenesulfonic acid and the like having a pH of 2 or less, in which the precipitants are insoluble. The pure α-isomer esters are precipitated from the aqueous solution when the pH of the latter is adjusted to 4 to 5.5 with alkali metal hydroxides, carbonates, or bicarbonates. The precipitants may also be removed from the adducts of their aqueous suspensions by means of suitable organic solvents substantially insoluble in water such as benzene, toluene, chloroform, ethylene dichloride, ethyl acetate, diethyl ether, and the like in which the α-aspartyl phenylalanine esters are practically insoluble.

The following Examples further illustrate the present invention.

EXAMPLE 1

A solution of 1.0 g α-L-aspartyl-L-phenylalanine methyl ester and 0.5 g β-resorcylic acid in 100 ml water was stored in a refrigerator overnight.

The crystals recovered by filtration of the mixture had a silky texture when dried. They weighed 0.5 g and melted at 182°–186° C. They were identified as an adduct of α-L-aspartyl-L-phenylalanine methyl ester with β-resorcylic acid in a mole ratio of 1:2 by their infrared spectrum and by elementary analysis:

| | | |
|---|---|---|
| Found: | 55.79% C; | 5.04% H; |
| | 4.83% N | |
| Calculated for $C_{28}H_{30}O_{13}N_2$: | 55.81 | 5.02 |
| | 4.65 | |

EXAMPLE 2

In the procedure of Example 1, an equal amount of gentisic acid was substituted for the β-resorcylic acid.

The crystals formed upon standing at low temperature were needle-shaped, weighed 0.8 g, and melted at 133°–134° C. They contained the dipeptide and gentisic acid in a mole ratio of 1:1, as evident from their infrared spectra and elementary analysis.

| | | |
|---|---|---|
| Found: | 54.27% C; | 5.53% H; |
| | 5.75% N | |
| Calculated for $C_{21}H_{24}O_9N_2 \cdot H_2O$: | 54.07 | 5.62 |
| | 6.01 | |

EXAMPLE 3

A solution of 1.0 g α-aspartyl-L-phenylalanine methyl ester and 1.0 g cinnamic acid in 100 ml 50 percent aqueous ethanol was stored in a refrigerator for two days.

Needle-shaped adduct crystals precipitated and were recovered by filtration and dried. They weighed 0.9 g, melted at 140°–141° C., and consisted of the dipeptide ester and cinnamic acid in a mole ratio of 1:1, as determined by infrared spectrum and elementary analysis.

| | | |
|---|---|---|
| Found: | 59.80% C; | 6.29% H; |
| | 6.35% N | |
| Calculated for $C_{23}H_{26}O_7N_2 \cdot H_2O$. | 59.99 | 6.13 |
| | 6.08 | |

EXAMPLE 4

3.0 g Cinnamic acid were added to a solution of 5.0 g α-aspartyl-L-phenylalanine methyl ester and 5.0 g β-L-aspartyl- L-phenylalanine methyl ester in 500 ml water. After stirring for five hours, the mixture was stored in a refrigerator overnight. The crystals formed were filtered out and dried. They weighed 6.3 g and were identified by their melting point and infrared spectrum as identical with the product prepared in Example 3.

5 Microliters of the filtrate were subjected to paper electrophoresis in aqueous acetic acid at pH 2.8 and 25 V/cm. The chromatogram so obtained was stained with cadmium ninhydrin by the method of J.Heilmann et al. [Z.Physiol.Chem. 309,(1957) 219] and showed two spots corresponding to α- and β-aspartyl-phenylalanine methyl ester respectively. The spots were excised, eluted with methanol, and the amounts of the α- and β-isomers in the filtrate were calculated from the absorbances of the eluates as 1.0 and 4.6 g respectively.

The bulk of the filtrate which had a pH of 3.7 was adjusted to pH 2 with hydrochloric acid and extracted with ether to remove the unreacted cinnamic acid. The aqueous layer was adjusted to pH 5.0 with sodium bicarbonate and evaporated to dryness in a vacuum. The residue, when recrystallized from water, yielded 3.6 g of the pure β-isomer (72 percent recovery) which melted at 189°–190° C. and was further identified by its nitrogen content of 9.30 percent, whereas 9.24 percent was calculated for $C_{14}H_{18}O_5N_2 \cdot \frac{1}{2}H_2O$. No α-isomer could be detected in the crystals by paper electrophoresis.

The 6.3 g of adduct was suspended in water and enough hydrochloric acid to make the pH 2.0. The cinnamic acid liberated was extracted with 200 ml ether, and the aqueous layer was then adjusted to pH 5.0 with sodium bicarbonate and evaporated to dryness in a vacuum. Upon recrystallization from water, 3.5 g pure α-isomer were obtained (70 percent recovery) which melted at 235°–236° C. and was further identified by elementary analysis.

Found: 55.50% C; 6.21% H; 9.35% N
Calculated for $C_{14}H_{18}O_5N_2 \cdot \frac{1}{2}H_2O$: 55.44  6.31  9.24

No β-isomer was found in the crystals by paper electrophoresis.

EXAMPLE 5

6.0 g β-resorcylic acid were added to a solution of 5.0 g α-L-aspartyl-L-phenylalanine methyl ester and 5.0 g β-L-aspartyl-L-phenylalanine methyl ester in 500 ml water. After stirring for 5 hours, the mixture was stored in a refrigerator overnight. The crystals precipitated were filtered out and dried. They weighed 9.3 g and were identified as the adduct obtained in Example 1 by their melting point and infrared spectrum.

When the filtrate was subjected to paper electrophoresis as described in Example 4, it was found to contain 1.0 g α-L-aspartyl-L-phenylalanine methyl ester and 4.9 g of the β-isomer. It yielded 3.9 g of the pure β-isomer (78 percent recovery) which melted at 189°–190° C, was further identified by its nitrogen content of 9.30 percent and was free from α-isomer in an amount detectable by electrophoresis.

The adduct described above was suspended in 500 ml water, and the suspension was adjusted to pH 2.0 and extracted with 250 ml ether to remove the β-resorcylic acid. The aqueous layer was adjusted to pH 5.0 and evaporated in a vacuum. The residue, when recrystallized from water, yielded 3.3 g of the pure α-isomer (66 percent recovery) which melted at 235°–236° C. and was further identified by paper electrophoresis.

EXAMPLE 6

2.8 g Sodium bicarbonate were added to a solution of 5.0 g α-L-aspartyl-L-phenylalanine methyl ester, 5.0 g β-L-aspartyl-L-phenylalanine methyl ester, 0.4 g L-aspartic acid, 7.1 g L-phenylalanine methyl ester hydrochloride and 1.9 g sodium chloride in 500 ml of water. The solution was extracted with 250 ml ethyl acetate and 75 percent of the L-phenylalanine methyl ester was recovered. The aqueous layer was evaporated in a vacuum until the ethyl acetate was driven off. The concentrate was diluted to 500 ml with water.

12 g β-Resorcylic acid were added to the diluted solution with stirring at room temperature. After stirring for 5 hours, the reaction mixture was stored in a refrigerator overnight. The crystals precipitated were filtered out and dried. They weighed 13.5 g and were identified as the adduct obtained in Example 1.

The filtrate was found by electrophoresis to contain 0.2 g α-L-aspartyl-L-phenylalanine methyl ester and 4.8 g β-L-aspartyl-L-phenylalanine methyl ester, and 4.1 g of the pure isomer were obtained by the procedure of Example 5.

The 13.5 g of adduct, when suspended in 500 ml water and decomposed as in Example 5, yielded 3.2 g of the pure α-isomer (64 percent recovery).

EXAMPLE 7

Each of the precipitants listed in Table 1 was added to 100 ml of an aqueous solution containing 1.0 g α-L-aspartyl-L-phenylalanine methyl ester and 1.0 g β-L-aspartyl-L-phenylalanine methyl ester in an amount of 1.2 moles per mole of the α-isomer. After stirring at room temperature for 5 hours, each mixture was stored in a refrigerator overnight. The precipitates formed were filtered off and decomposed with aqueous hydrochloric acid for recovery of the α-isomer and the precipitant.

Each filtrate was analyzed as described in Example 4 and the amounts of the originally present α- and β-isomers which had been removed by precipitation of the adduct were calculated. The results are listed in Table 1.

TABLE 1

| Precipitant | Percent of precipitation (%) | |
|---|---|---|
| | α-isomer | β-isomer |
| 5-chlorosalicylic acid | 82 | 1.3 |
| 2,4-dichlorophenoxyacetic acid | 66 | 0 |
| 2,5-dichlorophenol | 94 | 0 |
| 2,6-dichloro-4-nitrophenol | 74 | 0 |

When 1.0 g each of the α- and β-isomers of L-aspartyl-L-phenylalanine ethyl ester were dissolved in enough water to make 100 ml of solution, and β-resorcylic acid was added to the solution in an amount of 2.4 moles per mole of the α-isomer, the otherwise unchanged procedure showed that the precipitated adduct contained 94 percent of the α-isomer and 4 percent of the β-isomer.

EXAMPLE 8

Each of the precipitants listed in Table 2 was added to 100 ml of an aqueous solution containing 1.0 g α-L-aspartyl-L-phenylalanine methyl ester, 0.1 g L-aspartic acid and 0.1 g L-phenylalanine methyl ester in an amount of 1.2 moles per mole of the dipeptide. After stirring for 5 hours at ambient temperature, the mixture was allowed to stand in a refrigerator overnight. The precipitate formed was filtered out and dried. It was identified as the expected adduct of the dipeptide ester with the precipitant used by decomposition in water with hydrochloric acid and recovery of the dipeptide ester and the precipitant.

Each filtrate was analyzed by paper electrophoresis as described in Example 4 and the percentage of α-isomer precipitation was calculated.

The results are listed in Table 2.

TABLE 2

| Precipitant | Percent of precipitation (%) |
|---|---|
| β-phenylpropionic acid | 65 |

| | |
|---|---|
| cinnamic acid | 73 |
| o-fluorobenzoic acid | 24 |
| p-hydroxybenzoic acid | 69 |
| gentisic acid | 73 |
| 5-chlorosalicylic acid | 86 |
| 3,5-dinitrobenzoic acid | 93 |
| 2,4-dichlorophenoxyacetic acid | 77 |
| 2-naphthoic acid | 54 |
| β-naphthoxyacetic acid | 67 |
| 2,4-dichlorophenol | 80 |
| 2,5-dichloropheonol | 93 |
| 2,6-dichloro-4-nitrophenol | 74 |

When the ethyl ester of α-L-aspartyl-L-phenylalanine was substituted for the methyl ester in some of the above precipitation tests, 70 percent of the ester were precipitated with cinnamic acid, 90 percent with 3,5-dinitrobenzoic acid, 82 percent with 2,4-dichlorophenol, and 91 percent with 2,5-dichlorophenol. Closely similar results were achieved with the n-propyl, i-propyl, and n-butyl esters, and the alcohol moiety of the ester is without significance for the method of this invention as long as the solubility of the ester in aqueous media is not severely affected.

While the invention has been described with particular reference to specific embodiments, it is to be understood that it is not limited thereto, but is to be construed broadly and restricted solely by the scope of the appended claims.

What is claimed is:

1. A solid adduct of a lower alkyl ester of α-L-aspartyl-L-phenylalanine with a compound selected from the group consisting of β-phenylpropionic acid, cinnamic acid, o-fluorobenzoic acid, p-hydroxybenzoic acid, gentisic acid, β-resorcylic acid, 5-chlorosalicylic acid, 3,5-dinitrobenzoic acid, 2,4-dichloro-phenoxyacetic acid, 2-naphthoic acid, 62-naphthoxyacetic acid, 2,4-dichlorophenol, 2,5-dichlorophenol and 2,6-dichloro-4-nitrophenol.

2. A method of preparing the adduct of claim 1 which comprises reacting said ester with said compound in solution in an aqueous medium at pH 2 to 7 until said adduct is precipitated, and separating the precipitated adduct from the remainder of said solution.

3. A method of purifying a lower alkyl ester of α-L-aspartyl-L-phenylalanine which comprises reacting said ester with a precipitant selected from the group consisting of β-phenylpropionic acid, cinnamic acid, o-fluorobenzoic acid, p-hydroxy-benzoic acid, gentisic acid, β-resorcylic acid, 5-chlorosalicylic acid, 3,5-dinitrobenzoic acid, 2,4-dichlorophenoxyacetic acid, 2-naphthoic acid, β-naphthoxyacetic acid, 2,4-dichlorophenol, 2,5-dichlorophenol and 2,6-dichloro-4-nitrophenol while dissolved in an aqueous medium at pH 2 to 7 until an adduct of said ester with said precipitant is precipitated from said solution, separating the precipitated adduct from said solution, decomposing the precipitated adduct, and recovering the purified ester from the decomposition product.

* * * * *